ized_fpr ,997
PROCESS FOR PREPARING COPOLYMERS OF AZETIDINONES-(2) AND LACTONES
Albert Gustav Martin Gumboldt, Frankfurt am Main, and Siegfried Noetzel, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Mar. 17, 1967, Ser. No. 623,849
Claims priority, application Germany, Mar. 25, 1968, F 48,772
Int. Cl. C08g 20/30
U.S. Cl. 260—78                               2 Claims

ABSTRACT OF THE DISCLOSURE

A process for preparing copolymers from azetidinones-(2) substituted at the carbon atom, with lactones in the presence of organometallic compounds of zinc or aluminum as polymerization catalysts, which copolymers can be molded from the melt, for example into filaments by the melt spinning process.

---

The present invention provides a process for preparing copolymers from azetidinones-(2) with lactones.

It is known that azetidinones-(2) substituted at the carbon atom (=4-membered lactams) can be copolymerized to yield linear polyamides of a high molecular weight. In addition to homopolymers of analogous azetidinones-(2), copolymers have also been prepared from azetidinones-(2) which differ from each other by the substituents at the carbon atom.

According to Graf et al., Angewandte Chemie, 74, 525 (1962), copolymers of substituted azetidinones-(2) with α-pyrrolidone are also known.

As catalysts used for the anionic homo- and copolymerization of substituted azetidinones-(2) there are mentioned compounds having strongly basic properties, for example alkali alcohols, alkali metal hydrides, organo-alkalimetallic compounds, Grignard compounds, alkali- and alkaline earth metal salts of various open-chained carboxylic acid amides and of lactams, in particular the potassium salt of pyrrolidone. In some cases, alkali metal and alkaline earth metal hydroxides as well as alkali metal carbonates and alkali metal cyanides have also been used.

It appeared that some of the co-catalysts still further promote the polymerization of the substituted azetidinones-(2). Such co-catalysts are compounds capable of acylating the azetidinones-(2) at the nitrogen atom in the polymerization batch, for example acyllactams, isocyanates, carboxylic acid chlorides and carboxylic acid anhydrides. The homo- and copolyamides of the azetidinones-(2) substituted at the carbon atom, which have been prepared in the presence of the catalysts and co-catalysts mentioned, have valuable technical properties and high melting points, but they have the disadvantage that their decomposition temperatures are in immediate proximity of their melting temperatures. It is for this reason that, for example, fibers and films cannot or, only with difficulty, be made from the melt, but only by removing the solvent from the polymer solutions by evaporation or washing and simultaneously molding the substance (dry- or wet-spinning process).

It is furthermore known that the polymerization of lactones such as β-propiolactone, δ-valerolactone, ε-caprolactone, and their substitution products yields aliphatic polyesters which, however, are hardly usable as films, foils and fibrous material on account of their low softening points. As catalysts appropriate for this polymerization are mentioned basic as well as acid compounds, such as alkali metals, alkali metal hydrides and alkyli metal carbonates, organoalkalimetallic compounds, organic compounds of elements of Group II of the periodic system, such as Grignard compounds, dialkyl-zinc compounds, butyl-zinc diethyl amide, dialkyl-cadmium compounds, moreover organo-aluminum compounds, aluminum-trialkoxides, aluminum chloride, trifluoroacetic acid, mixtures of aluminum chloride and trifluoroacetic acid anhydride, perchlorates such as acetyl perchlorate, etc.

In recent times, the ring-opening copolymerization of lactones with epoxides carried out in the presence of basic or acid catalysts, has become known (cf. Cherdron, Ohse, Korte "Kautschuk und Gummi, Kunststoffe" 17, 380 (1964)). The copolymerization of a lactone, namely β-propiolactone, with epoxides such as ethylene oxide, epichlorhydrin, in the presence of organometallic compounds of the alkali metals or of aluminum as the catalyst, is disclosed in Belgian Patent No. 639,062. The copolymerization of trioxane with small amounts of a lactone under the action of acid catalysts is described in Belgian Patent No. 606,009.

It has now been found that high-molecular copolymers of lactams with lactones can be prepared in the presence of organo-metallic compounds by copolymerizing azetidinones-(2) substituted at the carbon atom, with lactones in an amount ranging from 10 to 45% by mol, calculated on the monomer mixture, and in the presence of organometallic compounds of zinc or aluminum as polymerization catalysts in an amount ranging from 0.1 to 5% by mol, calculated on the monomer mixture.

In these polymerization catalysts the metal may be linked to alkyl-, aryl-, aralkyl-, alkoxy-, aryloxy groups as well as to halogen or hydrogen atoms. For example, the following compounds usable as polymerization catalysts may be mentioned: Zinc dialkyls such as zinc dimethyl, zinc diethyl, zinc-di-n-butyl; zinc diaryls such as zinc diphenyl; zinc alkylhalides such as zinc octylchloride; zinc alkylalkoxides such as zinc butylbutoxide; aluminum-alkyls such as aluminum trimethyl, aluminum triethyl, aluminum triisopropyl, aluminum tri-isobutyl; dialkyl-aluminum halides such as diethyl-aluminum chloride, diethyl-aluminum bromide; dialkyl-aluminum hydrides such as diethyl-aluminum hydride, diisobutyl-aluminum hydride; aluminum aryls such as aluminum triphenyl; dialkyl-aluminum alkoxides such as diethyl-aluminum ethoxide or diisobutyl-aluminum acetylacetonate.

The organometallic catalysts may also be used after having been reacted with compounds containing reactive hydrogen, for example with water, alcohols such as ethanol, isopropanol, benzyl alcohol or ethylene glycol, with primary or secondary amines such as ethylamine, cyclohexylamine, aniline, diethylamine, N-methyl-aniline, and with enolizable chelating agents such as acetylacetone, benzoylacetylacetone or acetoacetic acid ester; but the reaction products must still contain at least one metal-carbon bond in the molecule.

Especially active catalysts are obtained, for example, by using half a mol of water or of a mixture of water and acetylacetone per one mol of the organometallic compound.

It is also possible to use the originally organometallic catalyst in combination with an acylating agent, for example aceto-anhydride, phenylisocyanate or N-benzoyl-ε-caprolactam, in which combination the proportion of the acylating agent may amout up to 20% by weight of the amount of the organometallic catalyst.

As azetidinones-(2) substituted at the carbon atoms, there are mentioned those carrying a simple alkyl- or aryl radical in 3- or 4-position, in particular 4-methylazetidinone-(2), 4-isopropylazetidinone-(2), 4-phenylazetidinone-(2), 4-p-tolylazetidinone-(2) and 4-p-chlorophenyl-azetidinone-(2) as well as, in addition, 3,3-dimethylazetidinone-(2).

The lactone-comonomers suitable for the copolymerization with these azetidinones-(2) substituted at the carbon atom, are unsubstituted lactones such as β-propiolactone, δ-valerolactone, 7-hydroxy-heptane-carboxylic acid lactone, 8-hydroxy-octane-carboxylic acid lactone, 12-hydroxy-dodecane-carboxylic acid lactone, in particular ε-caprolactone. Furthermore suitable are lactones substituted by monoalkyl and diallkyl groups, such as monoalkyl-δ-valerolactones, monoalkyl-ε-caprolactones, α,α-dialkyl-β-propiolactones, dialkyl-δ-valerolactones, in which the two alkyl groups ($CH_3$, $C_2H_5$; n- and i-$C_3H_7$; n-, i- and sec. $C_4H_9$) are linked to the same or to different carbon atoms of the lactone ring, and bicyclic lactones such as 3-oxo-2-oxabicyclo-[1,2,3]-octane (=3-hydroxycyclopentyl-acetic acid lactone), 3-oxo-2-oxybicyclo[2,2,3]-nonane, 3-oxo-2-oxabicyclo-[2,2,2]-octane, camphor lactone, 2-oxo-5.7.7-trimethyl-bicyclo-4,1,1]-octane-3-one, 2-oxa-bicyclo-[5,4,0]-undecane-3-one, 2,3,4,5 - tetrahydro-2-ketobenzoxepin, 2-(2'-hydroxymethylphenyl)-benzenecarboxylic acid lactone.

The copolymerization of the invention can be carried out continuously as well as discontinuously, the components being in substance, in dispersion or in solution. In the case of a solution polymerization, it is possible to operate in unpolar as well as in polar solvents which, however, must not contain an active hydrogen. Suitable solvents are, for example, aliphatic hydrocarbons such as hexane, heptane and higher homologs, aromatic hydrocarbons such as benzene, toluene, i-propylbenzene, p-xylene, chlorobenzene, o-dichlorobenzene, cycloaliphatic hydrocarbons such as cyclohexane and methylcyclohexane, dialkyl ethers such as diethyl ether, dibutyl ether, ethyleneglycol dimethyl ether and cyclic ethers such as dioxane and tetrahydrofurane.

It is advantageous to operate at a dilution ratio (proportion) of monomer mixture to solvent in the range of from 1:1 to 1:6. The work-up of the polymers prepared with solvents is, in most cases, facilitated by removing the solvent with steam after having added moist acetone. The precipitated polymers are then filtered off, washed and dried.

The polymerization temperature may be in the range of from −20° to 160° C., preferably from +20° C. to 100° C.

The polyester amides prepared according to the present invention are only decomposed at a temperature considerably exceeding their melting point and can therefore be molded from the melt, for example into filaments by the melt spinning method.

It is for this reason that they advantageously differ from polyamides which have exclusively been synthesized from azetidinones-(2) substituted at the carbon atom.

The following examples serve to illustrate the invention, but they are not intended to limit it thereto.

EXAMPLE 1

In an atmosphere of nitrogen, 10 milliliters of absolute toluene, 4 grams of 4-methyl-azetidinone-(2) and 1 gram of ε-caprolactone were heated for 50 minutes, while carefully stirring, with 1.2 milliliters of a 16.7%-by-weight solution of aluminum-triethyl in Sinarol (i.e. an aliphatic hydrocarbon fraction boiling at a temperature in the range of from 150 to 220° C.) to a temperature of 80° C. The gelatinous polymer which had separated was filtered off with suction after having been stirred with 20 milliliters of moist acetone, and dried in vacuo at 50° C. There were obtained 3.5 grams of a fine white powder having a melting point of 297° C. and a reduced viscosity of 1.03 in a 1% solution in concentrated sulfuric acid at 25° C. The decomposition temperature amounted to 307° C.

EXAMPLE 2

In an atmosphere of nitrogen, a mixture of 10 milliliters of absolute toluene, 4.5 grams of 4-methyl-azetidinone-(2), 0.5 gram of ε-caprolactone and 1.2 milliliters of a 16.7% by weight solution of aluminum-triethyl in Sinarol was stirred for 70 minutes at 80° C. A gelatinous mass separated which was filtered off after having been stirred with 20 milliliters of moist acetone, and was dried for some hours at 50° C. There were obtained 3.3 grams of a pulverulent material which melted at 306° C. and which had a reduced viscosity of 1.56 in a 1% solution in concentrated sulfuric acid at 25° C. The product decomposed at about 320° C.

EXAMPLE 3

2.5 grams of 4-methylazetidinone-(2) and 2.5 grams of ε-caprolactone were introduced into 10 milliliters of anhydrous heptane together with 3 milliliters of a catalyst solution prepared from 103 milliliters of heptane, 60 milliliters of absolute diethyl ether, 31 milliliters of aluminum triethyl and 2 milliliters of water, and the whole was maintained, while stirring, at 50° C. for 2 hours. When cool, the batch was stirred with 20 milliliters of moist acetone and the gelatinous mass which had been filtered off was dried overnight in vacuo and at 50° C. There were obtained 4.8 grams of a pulverulent material having a melting point of 254° C. and a reduced viscosity of 0.04 (in a 0.1% solution in concentrated sulfuric acid at 25° C.). The decomposition point was about 290° C.

EXAMPLE 4

In an atmosphere of nitrogen, 10 milliliters of anhydrous heptane, 2.5 grams of 4-methyl-azetidinone-(2) and 2.5 grams of ε-caprolactone were heated for 2 hours, while carefully stirring, with 3 milliliters of a catalyst solution prepared from 113 milliliters of absolute dioxane, 31 milliliters of aluminum triethyl, 11.3 milliliters of acetylacetone and 2 milliliters of water, to a temperature of 50° C. The batch was then stirred with moist acetone, distilled with steam and the solid polymer was dried in vacuo. The yield amounted to 3.5 grams of a pulverizable white material having a melting point of 274° C. and a reduced viscosity of 0.06 (in a 0.1% solution in concentrated sulfuric acid at 25° C.). The product decomposed at a temperature exceeding 296° C.

EXAMPLE 5

In an atmosphere of nitrogen, 2.5 grams of 4-methyl-azetidinone-(2), 2.5 grams of ε-caprolactone and 1.2 milliliters of a 16.7%-by-weight solution of aluminum-triethyl in Sinarol were added to 10 milliliters of anhydrous heptane and the whole was carefully stirred at room temperature. After about 2 minutes, 20 milligrams of N-benzoyl-caprolactam were added thereto and the whole was heated to 50° C. for 90 minutes. The gelatinous mass which had separated was filtered off after having been stirred with 30 milliliters of moist acetone, and was dried for some hours at 50° C. in vacuo. There were obtained 4.7 grams of a pulverulent polymer having a reduced viscosity of 0.05 in an 0.1% solution in concentrated sulfuric acid at 25° C. The product melted at 282° C. and decomposed at a temperature exceeding 300° C.

We claim:
1. A process for preparing high-molecular copolymers of a lactam with a lactone in the presence of organometallic compounds, which comprises copolymerizing at least one azetidinone-(2), selected from the group consisting of 4-methylazetidinone-(2), 4 - isopropylazetidinone - (2), 4-phenylazetidinone-(2), 4-p-tolylazetidinone-(2), 4 - p-chlorophenylazetidinone-(2) and 3,3-dimethylazetidinone-(2), with at least one lactone selected from the group consisting of β-propiolactone, δ-valerolactone, ε-caprolactone, 7-hydroxy-heptane-carboxylic acid lactone, 8-hydroxy-octane-carboxylic acid lactone, 12-hydroxy-dodecane-carboxylic acid lactone, monoalkyl-δ-valerolactones, monoalkyl-ε-caprolactones, α,α-dialkyl-β-propiolactones, dialkyl-δ-valerolactones, 3-oxo - 2 - oxabicyclo-[1,2,3]-octane, 3-oxo-2-oxa-bicyclo-[2,2,3]-nonane, 3-oxo-2-oxa-bicyclo-[2,2,2]-octane, camphor lactone, 2-oxo-5,7,7-tri- methylbicyclo-[4,1,1]-octane-3-one, 2-oxabicyclo-[5,4,0]-undecane-3-one, 2,3,4,5-tetrahydro-2-keto-benzoxepin and 2-(2'-hydroxymethylphenyl)-benzene-carboxylic acid lactone, in an amount ranging from 10 to 45 mol percent, calculated on the monomer mixture, and in the presence of organometallic compounds selected from the group consisting of zinc dimethyl, zinc diethyl, zinc di-n-butyl, zinc diphenyl, zinc octyl-chloride, zinc butylbutoxide, aluminum trimethyl, aluminum triethyl, aluminum triisopropyl, aluminum triisobutyl, diethyl aluminum chloride, diethyl-aluminum bromide, diethyl aluminum hydride, diisobutyl-aluminum hydride, aluminum triphenyl, diethyl aluminum ethoxide and diisobutyl-aluminum acetylacetonate as polymerization catalysts in an amount ranging from 0.1 to 5 mol percent, calculated on the monomer mixture.

2. A process for preparing high molecular weight copolymers of a lactam with a lactone in the presence of organometallic compounds, which comprises copolymerizing at least one azetidinone-(2) selected from the group consisting of 4-methylazetidinone-(2), 4-isopropyl-azetidinone-(2), 4-phenylazetidinone-(2), 4-p-tolylazetidinone-(2), 4-p-chlorophenylazetidinone-(2) and 3,3-dimethylazetidinone-(2) with ε-caprolactone, in an amount ranging from 10 to 45 mol percent, calculated on the monomer mixture, and in the presence of organometallic compounds selected from the group consisting of zinc dimethyl, zinc diethyl, zinc di-n-butyl, zinc diphenyl, zinc octylchloride, zinc butylbutoxide, aluminum triethyl, aluminum trimethyl, aluminum triisopropyl, aluminum triisobutyl, diethyl-aluminum chloride, diethyl-aluminum bromide, diethyl-aluminum hydride, diisobutyl-aluminum hydride, aluminum triphenyl, diethyl-aluminum ethoxide and diisobutyl-aluminum acetylacetonate as polymerization catalysts in an amount ranging from 0.1 to 5 mol percent, calculated on the monomer mixture.

References Cited

UNITED STATES PATENTS

| | | | |
|---|---|---|---|
| 2,071,251 | 2/1937 | Carothers | 260—78 |
| 2,551,702 | 5/1951 | Prochazka | 260—78 |
| 2,739,959 | 3/1956 | Ney et al. | 260—78 |
| 2,786,045 | 3/1957 | Chirtel et al. | 260—78 |
| 2,832,757 | 4/1958 | Munch et al. | 260—78 |
| 3,093,618 | 6/1963 | Graf et al. | 260—78 |
| 3,211,706 | 10/1965 | Borner | 260—78 |

HAROLD D. ANDERSON, Primary Examiner

U.S. Cl. X.R.

260—30.8